United States Patent [19]
Grome et al.

[11] Patent Number: 4,825,759
[45] Date of Patent: May 2, 1989

[54] ADC COFFEE MAKER

[75] Inventors: Donald C. Grome, Columbus; Joseph F. Moore; Terry L. Myers, both of Chillicothe, all of Ohio; Thomas J. Ryan, San Diego, Calif.; Kenneth E. Wilkinson, Round Lake, Ill.

[73] Assignee: WearEver-ProctorSilex, Inc., Glen Allen, Va.

[21] Appl. No.: 1,705

[22] Filed: Jan. 9, 1987

[51] Int. Cl.$^4$ ............................................. A47J 31/057
[52] U.S. Cl. ....................................... 99/307; 99/285; 99/306
[58] Field of Search ................. 99/279, 285, 298, 295, 99/300, 304, 306, 307, 316, 317, 281, 282, 283, 284, 323; 426/433

[56] References Cited
U.S. PATENT DOCUMENTS

| | | |
|---|---|---|
| D. 234,284 | 2/1975 | Stuetzer et al. ............ D7/62 |
| D. 234,449 | 3/1975 | Stuetzer et al. ............ D7/62 |
| D. 234,487 | 3/1975 | Stuetzer et al. ............ D7/62 |
| D. 251,821 | 5/1979 | Levine . |
| D. 271,074 | 10/1983 | Richardson . |
| 1,174,683 | 3/1916 | Chamberlain . |
| 1,577,431 | 3/1926 | Hagel . |
| 1,632,342 | 6/1927 | Lambert . |
| 1,845,020 | 2/1932 | Haines . |
| 2,053,923 | 9/1936 | Stewart . |
| 2,234,397 | 3/1941 | Bentz ...................... 99/306 |
| 2,663,248 | 12/1953 | Johnson ................... 99/310 |
| 3,145,708 | 8/1964 | Fischer . |
| 3,425,338 | 2/1969 | Vittoe ...................... 99/295 |
| 3,527,153 | 9/1970 | Orlando .................... 99/315 |
| 3,696,733 | 10/1972 | Beverett .................... 99/307 |
| 4,138,606 | 2/1979 | Brown ...................... 99/281 |
| 4,155,292 | 5/1979 | Rickert .................... 99/306 |
| 4,205,598 | 6/1980 | Leuschner et al. .......... 99/307 |
| 4,422,442 | 12/1983 | Gutmann et al. . |
| 4,432,340 | 2/1984 | Conant et al. . |
| 4,629,866 | 12/1986 | Proctor . |

FOREIGN PATENT DOCUMENTS

| | | |
|---|---|---|
| 6925291 | 6/1969 | Fed. Rep. of Germany . |
| 7105249 | 2/1971 | Fed. Rep. of Germany . |
| 1944578 | 3/1971 | Fed. Rep. of Germany . |
| 2260330 | 5/1974 | Fed. Rep. of Germany . |
| 2264588 | 6/1974 | Fed. Rep. of Germany . |
| 2754940 | 6/1979 | Fed. Rep. of Germany ........ 99/295 |
| 1486388 | 9/1977 | United Kingdom . |

OTHER PUBLICATIONS

Bloomfield Industries "Koffee King" advertisement in *Institutions*, Feb. 1, 1980, p. 7.
Notebook showing proposed Procter Silex Coffeemakers as described in attached Information Disclosure Statement, undated.
Xerographic Copy of a Photo Showing a Prototype ADC Coffeemaker, undated.
Coffee Maker (Design), Grome, Ser. No. 946,244, filed Dec. 23, 1986.
Coffee Maker (Design), Ryan, Ser. No. 863,679, filed May 15, 1986.

*Primary Examiner*—Robert W. Jenkins
*Attorney, Agent, or Firm*—Roger S. Dybvig

[57] ABSTRACT

An ADC coffee maker has a brewed coffee container and a cold water compartment surrounding part of the brewed coffee container located in a single housing. The coffee maker housing includes an upper housing member made from a thermoplastic material and a lower housing made from a thermoplastic material and forming the lower part of the brewed coffee container, such lower part being closed by a stainless steel warmer plate. A cold water fill port is located adjacent the upper end of the brewed coffee container. A uniquely constructed brew basket is provided and a uniquely constructed lid that covers the brewed coffee container and the fill port is also provided.

36 Claims, 5 Drawing Sheets

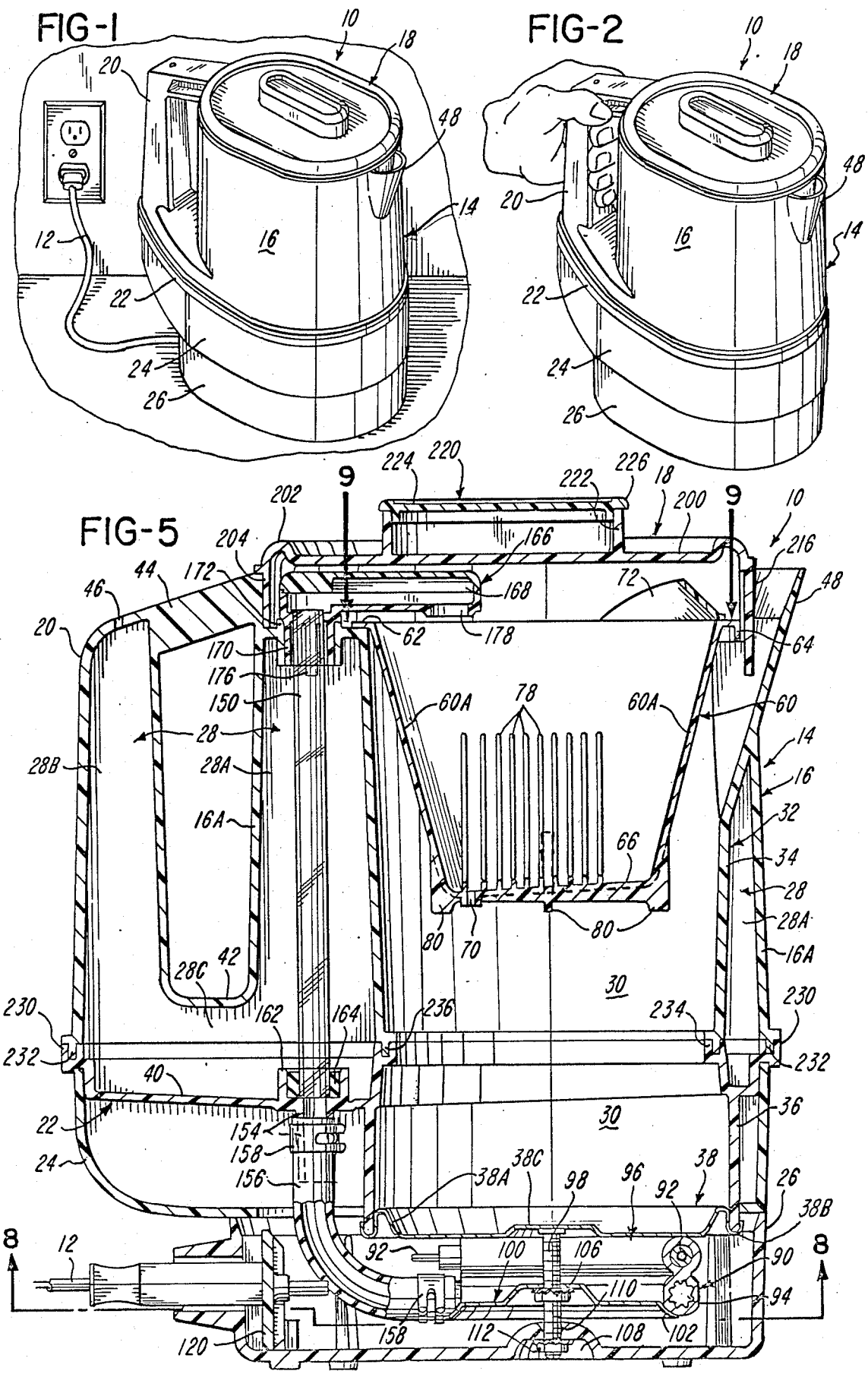

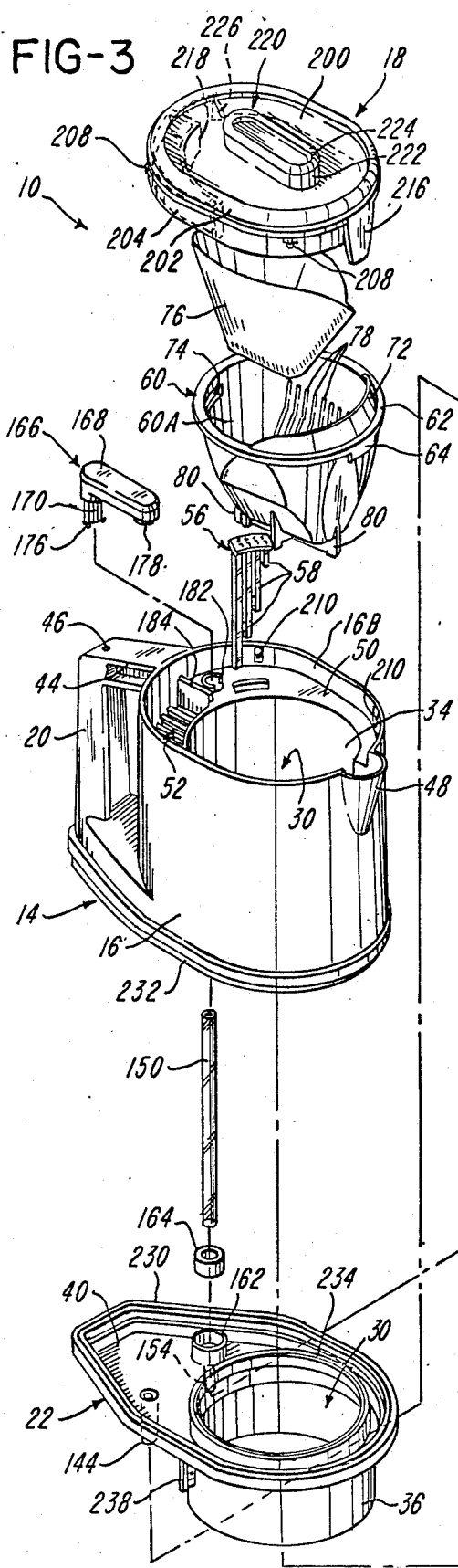
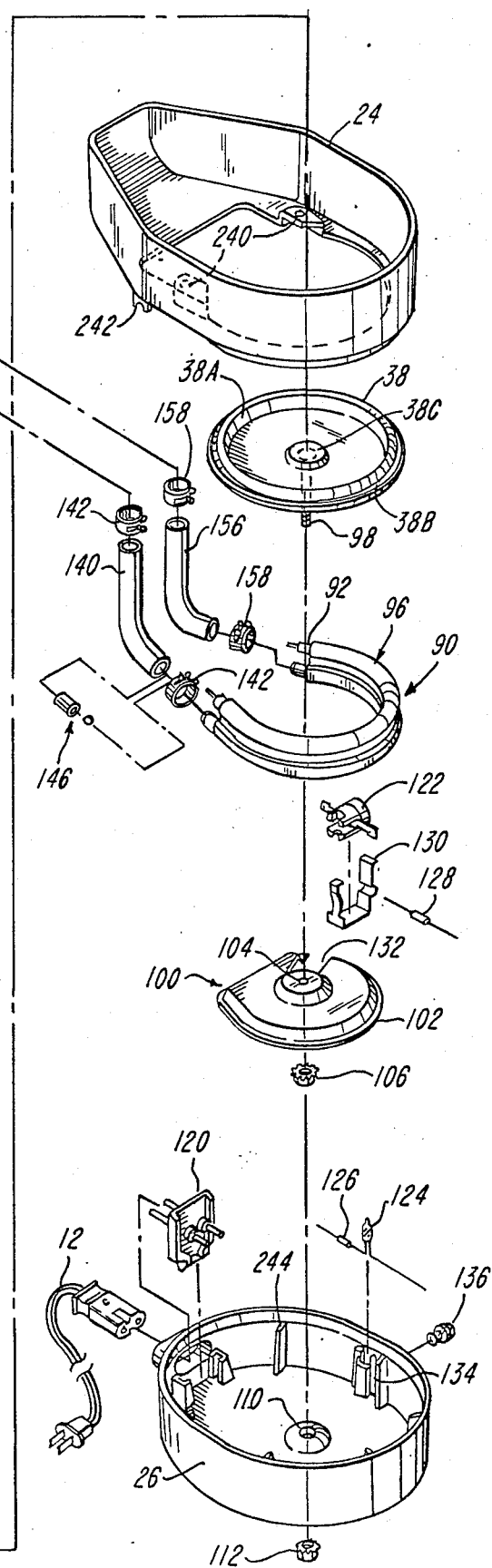
FIG-3

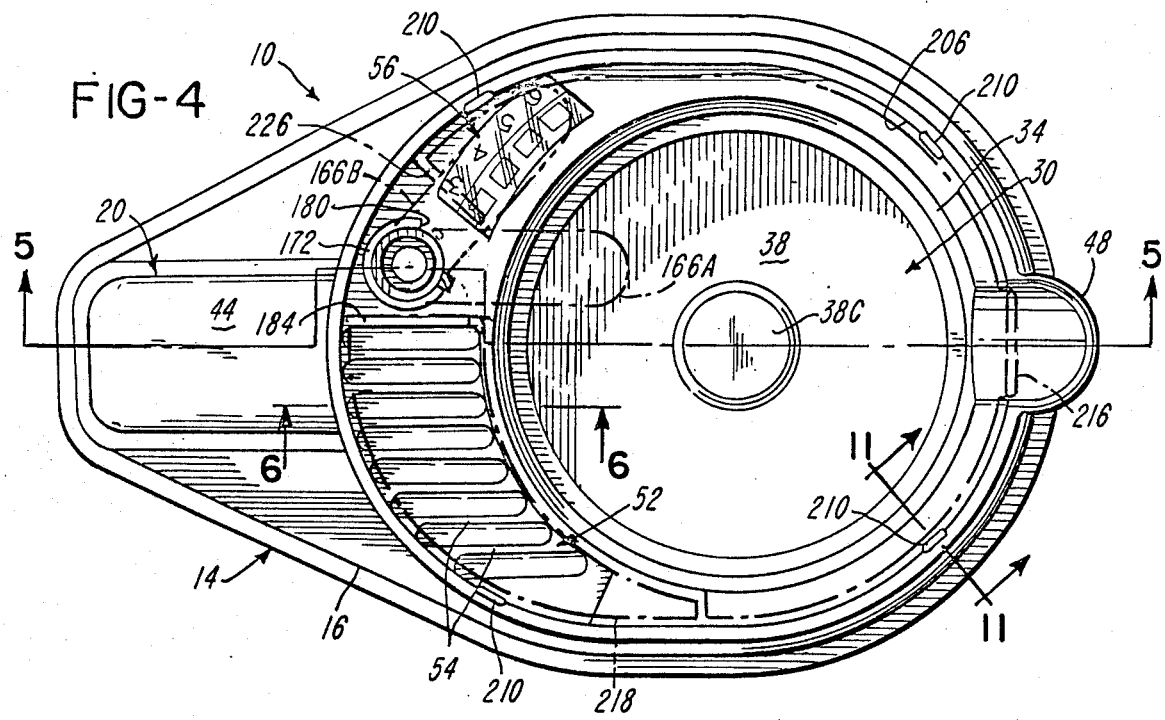
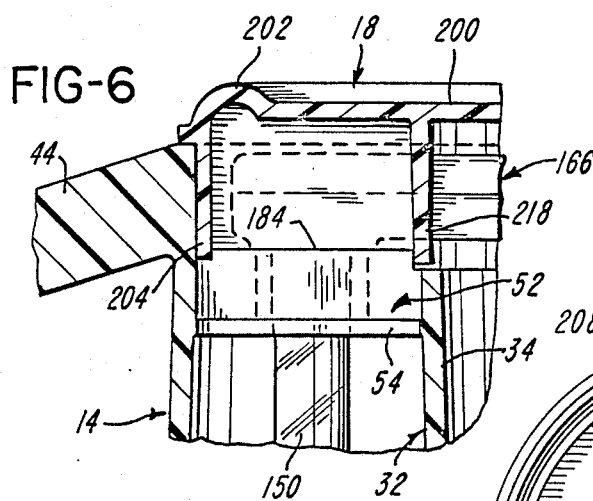
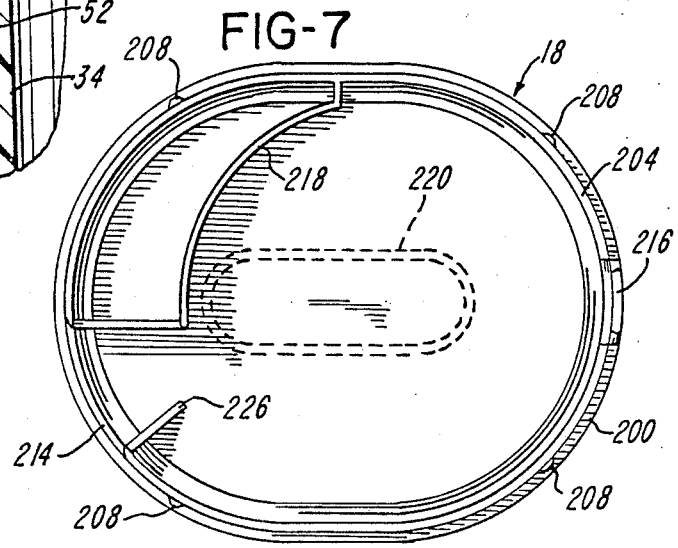

ADC COFFEE MAKER

BACKGROUND OF THE INVENTION

This invention relates to an automatic drip or ADC coffee maker.

A common form of ADC coffee maker includes a housing for a cold water compartment, a warmer plate, an ADC heater and pump assembly, and a brew basket or the like. Cold water in the cold water compartment is heated and pumped through an up tube or riser to a spreader tube and poured into the brew basket where it engages coffee grounds previously placed in the basket, forms brewed coffee, and drains into a separate coffee container or carafe that is removably positioned on the warmer plate. Coffee brewed in this manner is generally preferred to percolator brewed coffee, apparently because the freshly heated hot water passes only once through the coffee grounds whereas, in a percolator, partly brewed coffee recycles through the coffee grounds.

An object of this invention is to provide an ADC coffee maker which does not have a separate carafe. Rather, the coffee maker is a single unit in the sense that all of its parts, including the carafe, are in one housing so that it may be carried about and stored in the same manner as an ordinary percolator. Various suggestions and attempts have been made to provide such an ADC coffee maker. However, the known coffee makers of this type have been designed so that they would be excessively large in relation to the amount of coffee that may be brewed at any one time, either in a vertical or in a horizontal direction, or quite expensive, or quite complex and unreliable.

A further object of this invention is to provide such a single-unit ADC coffee maker which is relatively inexpensive, attractively styled, convenient and safe to use, and easy to clean.

Another object of this invention is to provide such a single-unit ADC coffee maker having a housing molded from a thermoplastic material having compartments for containing both the cold water and the brewed coffee, wherein a single ADC heater and pump assembly is used to heat the cold water for brewing and for maintaining the brewed coffee warm after brewing. A related object is to provide such a coffee maker in which the thermoplastic material in the area of the ADC heater and pump assembly is not heated to the extent that it may soften and lose its shape. Also, it is an object to provide such a coffee maker wherein the brewed coffee compartment is in a container comprising a thermoplastic, cylindrical member open at its upper end and closed at its lower end by a metal warmer plate. Although several thermoplastic materials may be used, polypropylene is presently considered to be the material of choice. An ADC heater and pump assembly is preferably mounted on the bottom of the warmer plate and the warmer plate preferably comprises a stainless steel plate seamed in liquid tight relationship to the bottom of the cylindrical, thermoplastic body member.

Another object of this invention is to provide an ADC coffee maker having a brewed coffee container located within a cold water compartment wherein the brewed coffee stays warm over relatively long periods of time if its heater is disconnected from a source of electricity and wherein the outside of the coffee maker housing remains relatively cool so that it may be safely and comfortably handled. To this end, the brewed coffee container is surrounded partly by the cold water compartment and otherwise substantially surrounded by dead air space. During the brewing process, the cold water compartment is emptied so that the freshly brewed coffee is substantially completely surrounded by dead air spaces and thereby insulated from the outer wall of the coffee maker.

Briefly, an ADC coffee maker in accordance with this invention has a brewed coffee container located within a housing, the brewed coffee container having a pour spout at its upper end extending upwardly and outwardly to the outside of the coffee maker. The brewed coffee container is formed from a thin-walled, generally cylindrical plastic body member open at its upper end and closed at its lower end by a metal warmer plate, the outer margin of which is seamed to the bottom of the plastic body member. An ADC heater and pump assembly is mounted on the underside of the warmer plate. The coffee maker further includes a brew basket removably mounted in the upper end of the brewed coffee container. A removable lid is provided to permit access to the portion of the housing containing the brewed coffee container to permit access to the brew basket and the brewed coffee container.

A cold water compartment having a fill port adjacent the brew basket surrounds part of the brewed coffee container. The fill port is located within a cold water compartment cover panel that spans between the upper end of the brewed coffee container and a wall of a housing that houses the cold water compartment and the brewed coffee container. Removal of the lid also provides access to the cold water fill port.

A hot water spreader or spigot is provided for delivering water pumped through hot water delivery means from the ADC pump to the brew basket. The spigot is pivotal about a generally vertical axis so that it may be pivoted to a position wherein it does not interfere with the removal of the brew basket means.

The coffee maker housing is so constructed that, after the cold water has been pumped from the cold water compartment, the brewed coffee container is substantially completely surrounded by dead air spaces which insulate the brewed coffee container from the outer walls portions of the coffee maker. Means are provided for restricting heat losses through the spout and also to prevent substantial spillage of brewed coffee or coffee grounds if the coffee maker is accidentally upset.

In the presently preferred embodiment of this invention, the housing comprises a thermoplastic upper housing member and a thermoplastic lower housing member that are bonded together to form and enclose the cold water compartment and also to form all of the brewed coffee container except for the warmer plate which closes its lower end. A hollow handle may form part of the cold water compartment.

Still a further object of this invention is to provide an improved brew basket especially adapted for use with an ADC coffee maker. In accordance with this invention, the brew basket comprises a cup-like body for receiving a filter and fresh coffee grounds and having means at its upper end for deriving support from a brewed coffee container. The floor of the brew basket slopes downwardly from front to rear and a coffee drain port is at the rearward end of the floor. The floor has side edges converging from a maximum separation at its front end to a lesser separation at its rearward end. By proper selection of the slope of the floor and its width, the proper pressure head of brewed coffee is formed for the desired rate of flow of the brewed coffee through the drain port. The brew basket further comprises a baffle along the upper front margin thereof to protect against coffee grounds falling out of the basket when brewed coffee is being poured.

Other objects, advantages, and features of the invention will become apparent from the following description, the claims, and the accompanying drawings.

BRIEF DESCRIPTION OF THE DRAWINGS

FIG. 1 is a perspective view of an ADC coffee maker in accordance with this invention shown with a power cord plugged into an electric utility outlet.

FIG. 2 is a perspective view of the coffee maker of FIG. 1 being carried about with the power cord unplugged.

FIG. 3 is an exploded perspective view of the coffee maker of FIG. 1.

FIG. 4 is a top plan view of the housing of the coffee maker of FIG. 1. FIG. 4 also shows a cold water level indicator in full lines, two positions of a spreader tube in phantom, and depending parts of a lid in phantom.

FIG. 5, on the first sheet of drawings, is a cross sectional view of the coffee maker of FIG. 1 taken centrally through the lid and through the housing as indicated by section line 5—5 of FIG. 4.

FIG. 6, on the third sheet of drawings, is a cross sectional view of a portion of the lid and the housing as indicated by the section line 6—6 of FIG. 4.

FIG. 7 is a bottom plan view of the lid.

DESCRIPTION OF THE PREFERRED EMBODIMENT

Figure 8:
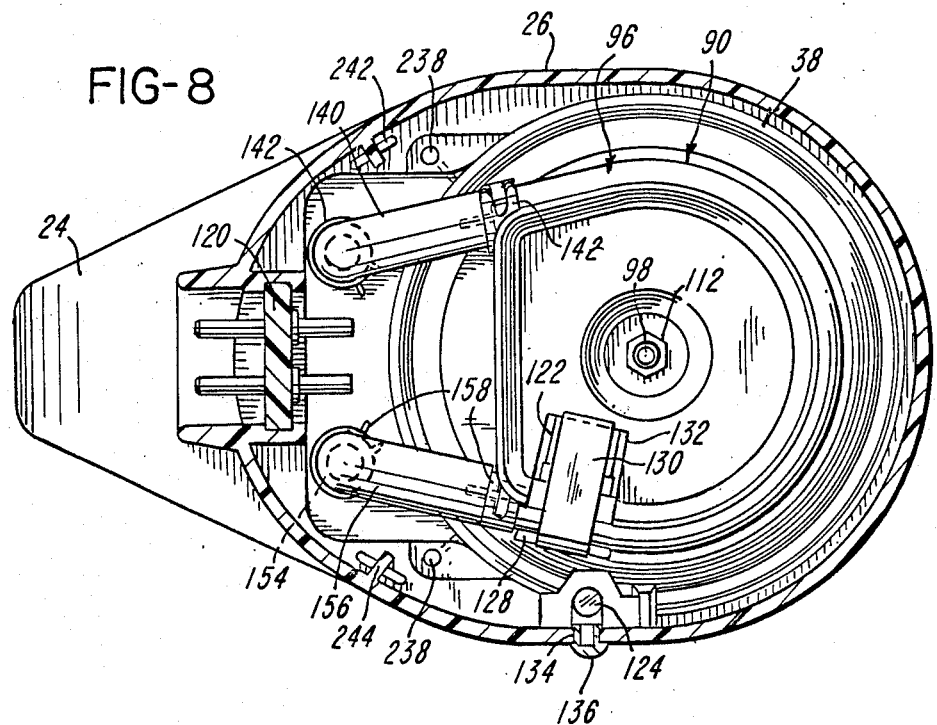
FIG. 8 is a cross sectional view of the coffee maker taken along section line 8—8 of FIG. 5 and showing the bottom of the ADC heater and pump assembly and related parts.
Figure 14:
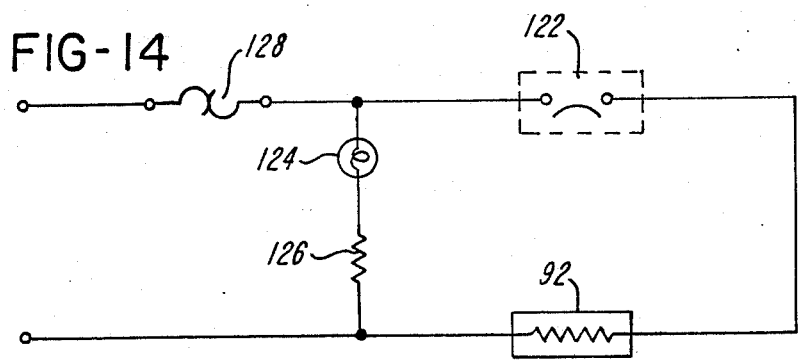
FIG. 14, on the fourth sheet of drawings, is a schematic electric circuit diagram of the coffee maker of FIG. 1.

Referring to the drawings in greater detail, an ADC coffee maker, generally designated 10, in accordance with this invention is shown in FIG. 1 connected to a household electric utility outlet by means of a power cord 12. After brewing coffee in the coffee maker 10 as will be described below, the power cord 12 may be unplugged from the utility outlet and the coffee maker 10 may then be carried about as shown in FIG. 2. In accordance with this invention, the coffee maker 10 will tend to maintain the brewed coffee warm for extended periods of time, even if unplugged, so that one may brew coffee at one location, such as a household kitchen countertop, and then move the coffee maker 10 to another location, such as a dining room table for serving guests.

With continued reference to FIGS. 1 and 2, and with reference also to FIG. 3 the coffee maker 10 comprises an upper housing member 14 including a first, vertically extending, generally tubular housing portion 16 having an outer wall 16A and constructed to be closed by a lid 18. Upper housing member 14 further includes a carrying handle 20 spaced from the tubular housing portion 16. Coffee maker 10 further comprises a lower housing member 22 having a cup-like, upwardly facing cover member 24. A coffee maker base 26 supports the lower housing cover member 24 which in turn supports the housing members 14 and 22.

The assembled housing members 14 and 22 are compartmented to form a cold water compartment, generally designated 28, and a brewed coffee compartment, generally designated 30. Brewed coffee compartment 30 is located within a brewed coffee container 32 comprising a thin-walled body formed generally as a right circular cylinder from an internal, upper cylindrical wall 34 inside the upper housing member 14 and an internal, lower cylindrical wall 36 forming part of the lower housing 22. Cylindrical walls 34 and 36 are bonded together as will be described below. The bottom of the brewed coffee container 32 is formed by a circular warmer plate 38 having its outer margin seamed, as by rolling, onto the bottom edge of the lower cylindrical container wall 36 in liquid tight relation thereto.

Cold water compartment 28 surrounds part of the brewed coffee container 32 and is bounded by the outer wall of the upper housing member 14 and, at its bottom end, by a cold water compartment base wall 40 that forms part of the lower housing member 22 and that extends generally transversely to the cylindrical wall 36. The cold water compartment is formed generally into three sections by the outer wall portions of the upper housing member 14, namely a first, vertically extending, generally tubular section 28A formed by the first housing portion 16 and around the upper portion of the brewed coffee container 32, a second section 28B spaced from the first section 28A and located within the handle 20, and a third section 28C merging with and interconnecting the lower end portions of the first and said second sections 28A and 28B. Third section 28 is located beneath a connecting wall portion, designated 42, of the upper housing member 14 spanning between the first housing section 16 and the handle 20. The connecting wall portion 42 is of a sufficient horizontal extent that the handle 20 is so remote from the first housing portion 16 that one's fingers may be conveniently wrapped around the handle 20 as shown in FIG. 2. The handle 20 is formed as a hollow, thin-walled, vertically projecting post. Preferably, its upper end is connected to the upper end of the first housing portion 16 by a stiffening rib 44 that rigidifies the handle 20 and cooperates therewith to assist one in carrying the coffee maker 10. To prevent an air lock in the cold water compartment section 28C, and thereby permit it to be filled with cold water, an air vent opening 46 extends through the upper wall of the handle 20.

A pour spout 48 extends from the upper end of the brewed coffee compartment 30 upwardly and outwardly of the surrounding wall portions of the outer wall 16A of the first housing portion 16. Pour spout 48 forms an upwardly opening trough for pouring brewed coffee out of the brewed coffee container 32. Its margins merge both into the wall of the brewed coffee container 32 and into the outer wall 16A. To improve the pouring characteristics of the pour spout 48, its wall tapers to a thinner thickness at its upper end.

Referring to FIGS. 3, 4 and 5, an arcuately extending cover panel 50 spans between the uppermost end of the brewed coffee container 32 and the inside surface, designated 16B, of the outer wall 16A of the first housing portion 16. Cover panel 50 is substantially planar except that it has a recessed cold water-fill port 52 opening to the cold water compartment 28. Fill port 52 is interrupted by plural bars 54 that form a grill to prevent large objects from entering the cold water compartment 28.

An optical level indicator 56 is provided having four transparent, indicator rods 58, which may be made from a clear polycarbonate plastic, depending from the cover panel 50 into the cold water compartment 28. As known to those familiar with indicators of this type, when the water level within the cold water compartment section 28A reaches a given indicator rod 58, the appearance of the top of the rod changes so that the water level is indicated. For convenience, the top plate of the indicator 56 may be marked in cup units.

Figure 9:
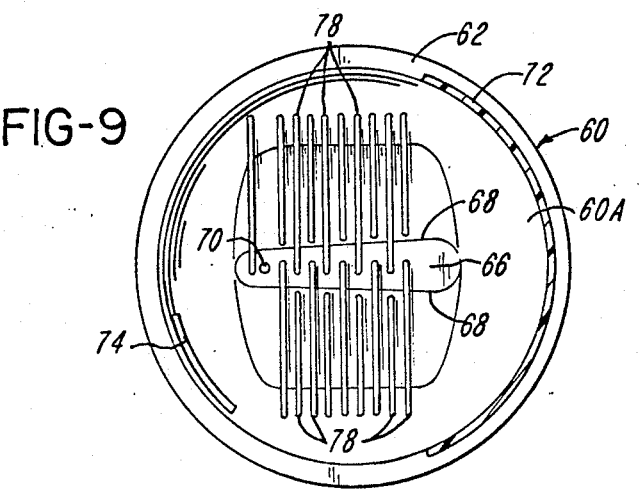
FIG. 9 is a cross sectional view of a brew basket forming part of the coffee maker of FIG. 1 taken along section line 9—9 of FIG. 5.

Referring to FIGS. 3, 5, and 9, a removable, cup-like brew basket 60 is provided having a peripherally extending, outwardly projecting flange 62 along its upper margin. In use, flange 62 is adapted to rest upon the cover panel 50 and thereby suspend the brew basket 60 in the upper end of the brewed coffee compartment 30. Brew basket 60 is circular at its upper end and has downwardly and inwardly sloping walls 60A. The basket 60 has several features of interest. For purposes of this application, the spout-located margin of the coffee maker 10 is treated as the "front" of the coffee maker 10 and the handle 20 is considered to be at the "rear" of the coffee maker 10. The brew basket 60 is provided with a locating tab 64 depending from the extreme front end edge of the flange 62 which projects into the spout 48 between spaced parts of the cover panel 50 in order to properly orient the brew basket within the brewed coffee container 32.

Proper orientation of the brew basket 60 is needed because it has a planar, sloping floor or drain pan 66 with side edges 68 converging from a maximum separation toward the front to a lesser separation toward the rear. Floor 66 also slopes downwardly from front to rear as seen best in FIG. 5. A brewed coffee drain port 70 opens at the rear of the floor 66 to the brewed coffee compartment 30. By virtue of this construction, an appropriate pressure head and flow rate of the brewed coffee through the drain port 70 can be obtained. The precise slope angle and the size of the floor 66 will depend on the characteristics of the ADC pump being used and other factors, and may be determined by experiment. The rearward location of the drain port 70 is further advantageous in that, when the coffee maker 10 is tilted to pour coffee out through the spout 48, the coffee inside the brewed coffee container 32 will not enter the drain port 70 and mix with the used coffee grounds, whereas that could happen if the drain port were located nearer the spout. Proper orientation of the brew basket 60 is also important because it has a baffle or guard 72 extending above and arcuately along the upper, front part of the flange 62. With this construction, the baffle 72 prevents coffee grounds from accidentally spilling out of the brew basket 60 when coffee is being poured.

To avoid an accidental overflow of hot water, perhaps with loose coffee grounds, into the cold water fill port 52, an overflow slot 74 is located along a wall portion of the brew basket 60. Such an overflow could be caused by an unexpected clogging of the drain port 70, and, if permitted to enter the cold water compartment section 28C, could cause excessive heating of the coffee maker housing adjacent the handle 20 and perhaps also could damage the ADC pump. Because of the overflow slot 74, any overflow will fall harmlessly into the brewed coffee container 32.

The brew basket 60 is used with replaceable coffee filters 76 (one being shown in FIG. 3) made from paper or the like material and that restrict the flow of water to the brew basket floor 66. The sidewalls and floor 66 of the brew basket 60 are provided with upstanding ridges or ribs 78 that support the filter 76 above the floor 66. The flow rate of hot water to the filter 76 relative to the flow rate of water through the filter 76 and the coffee grounds deposited therein is preferably such that the hot water pools in the coffee grounds and seeps relatively slowly downwardly therethrough.

As a convenience, the bottom outer surface of the brew basket 60 may be provided with depending lugs or feet 80 so that the basket, when removed from the coffee maker housing, may be stood upright on a support surface.

With reference to FIGS. 3, 5, 8 and 14, an ADC heater and pump assembly, generally designated 90, is provided for heating water drawn from the cold water compartment 28 and pumping it to the brew basket 60. The heater and pump assembly 90 may be of essentially conventional construction and includes a heating element 92 mounted on top of a pump chamber 94 in a common, U-shaped housing 96. The ADC heater and pump assembly 90 is mounted on the underside of the warmer plate 38 by a clamping assembly comprising a threaded stud 98 connected, as by welding, integrally with the warming plate 38 and depending centrally therefrom. The clamping assembly further comprises a clamp plate 100 having an outer, arcuate channel 102 for receiving and holding the lower part of the heater and pump assembly 90 and a central aperture 104 through which the stud 98 depends. A lock nut 106 threaded on the stud 98 is drawn tightly against the bottom of the clamp plate 100 to hold the heater and pump assembly 90 securely against the bottom of the warmer plate 38 in good heat exchanging relationship therewith. Here it may be noted that the coffee maker base 26 has a central, raised portion forming a recess 108 beneath the base 26 with a centrally located aperture 110 through which the threaded stud 98 extends, and that the base 26 is held to the remaining parts of the coffee maker 10 by a lock nut 112 located within the recess 108 and threaded onto the stud 98.

Electrical power is supplied to the ADC heater and pump assembly 90 by a male receptacle 120 mounted in the rear portion of the base 26 and having rearwardly extending prongs for connection to the power cord 12 and forwardly extending prongs for internal wiring (not shown) connected to the heating element 92 and other electrical circuit components to be described. The electrical circuit, shown in FIG. 14, may be conventional and comprises a thermostat 122 in series with the heating element 92, and a small neon light 124 in series with a resistor 126, both of which are connected in parallel relation to the heating element 92 and the thermostat 122. A thermal fuse or cut off device 128 may be located in the hot line for protection of the coffee maker in the event excessive heat is generated. The thermostat 122 and the fuse 128 may be held tightly against the heater and pump assembly housing 96 by a U-shaped spring clamp 130. Room for the spring clamp 130 and the thermostat 122 is provided by a cutout 132 in the clamp plate 100. The neon light 124 may be held in a slotted holder 134 in the coffee maker base 26 and exposed through a lens 136 extending through an aperture in one side of the base 26.

The flow of water from the cold water compartment 28 to the ADC heater and pump assembly 90 and the flow of hot water (and associated steam) from the ADC heater and pump assembly 90 to the brew basket 60 is accomplished by a first, cold water conduit in the form of a flexible cold water supply hose or elbow 140 clamped by a first hose clamp 142 at its upper end to a depending, hollow, water exit tube 144 formed integrally with and depending from the cold water compartment base wall 40 and clamped by a second hose clamp 142 at its lower end to the ADC heater and pump assembly housing 96 so as to be in liquid communication with the pump chamber 94. To insure that the cold water compartment is fully emptied with each use of the coffee maker 10, its base wall 40 slopes so that the water exit tube 144 is at its lowest point. A ball check valve assembly 146 located within the cold water supply elbow 140 which closes in response to pressure created by the water being heated in the pump chamber 94 to prevent, in known fashion, the flow of heated water back into the cold water compartment 28.

Hot water conduit means is provided for delivering hot water from the pump chamber 94 to the brew basket 60. With reference to FIGS. 3, 5, and 8, such hot water conduit means comprises an up tube or riser 150 extending vertically through the rear of the first section 28A of the cold water compartment 28. The lower end of the up tube 150 is supported by the top surface of the cold water compartment base wall 40 and is aligned with a hollow, hot water delivery tube 154 depending from the base wall 40 to which hot water is supplied from the pump chamber 94 by a flexible hose or elbow 156 connected by hose clamps 158 to the heater and pump housing 96 and to the hot water delivery tube 154. Alignment of the up tube 150 with the hot water delivery tube 154 is maintained by a gasket-retaining sleeve 162 that projects upwardly from the cold water compartment base wall 40 and by a small, tubular rubber gasket 164 confined therein in the bore of which the lower end of the up tube 150 is received.

The hot water conduit means further comprises a spreader or spigot, generally designated 166, that includes a hollow, horizontally extending tube portion 168 and a downwardly extending bearing sleeve 170 connected to the proximal end of the tube portion 168 and journalled for rotation within a vertical spigot-mounting sleeve 172 formed integrally with the cover panel 50 and axially aligned with the hot water delivery tube 154. The inside of the bearing sleeve 170 has a neck portion snugly engaging the upper end of the up tube 150 to form a seal there around preventing hot water from flowing downwardly into the cold water compartment 28. The bearing sleeve 170 is axially slotted to provide spring fingers 174 terminating at their lower ends in radially outwardly projecting flanges 176 which underlie the spigot-mounting sleeve 172 and cooperate with a shoulder 168A on the proximal end of the horizontally extending spigot tube portion 168 to axially confine the spigot 166 but permit pivotal movement of the spigot 166 about the axis of the up tube 150. Water heated by the ADC heater and pump assembly 90 flows upwardly through the up tube 150, through the proximal end of the spigot 166, horizontally along the spigot tube portion 168 and then downwardly through a drain opening 178 in its distal end into the brew basket 60 or, more precisely, into the filter 76 in the brew basket 60.

Pivotal movement of the spigot 166 is provided so that it may be moved out of the way to enable convenient removal of the brew basket 60 or the filter 76. However, the range of pivotal movement of the spigot 166 is limited, the extreme ends of the range being indicated by the phantom lines 166A and 166B in FIG. 4. To limit the range, the vertical spigot mounting sleeve 172 is cut away to provide a pair of vertically extending, circumferentially spaced stop edges 180. A stop dog 182 is located on the spigot 166 for engaging one or the other of the stop edges 180 to prevent movement of the spigot 166 beyond the permitted range. In FIG. 4, it will be noted that the pivotal movement of the spigot is so limited that its distal end is either over the brew basket 60 or else over a portion of the cover panel 50 remote from the cold water fill port 52. Accordingly, should the coffee maker 10 be accidentally operated with the spigot in its out-of-the-way position 166B, the hot water will not enter the cold water compartment 28. Further to this end, a barrier in the form of a rib 184 upstanding from the cover panel 50 along the edge of the cold water fill port 52 nearest the proximal end of the spigot 166 is provided to prevent any hot water that may flow along the cover panel 50 from entering the cold water compartment 28.

Turning attention to FIGS. 3 through 7 and 11 through 13, the lid 18 comprises a recessed center panel portion 200 adapted to cover the brew basket 60 and the cover panel 50 and further comprises an inverted U-shaped, ovate, flanged rim 202 from which a skirt 204 depends. Rim 202 engages the correspondingly ovate, upper edge of the first housing section 16. Four circumferentially spaced locking tabs 208 project outwardly from the skirt 204 and enter cooperating recess 210 in the inside wall portion 16B to securely maintain the lid 18 in place. The recesses 210 have sloping upper walls 212 that cooperate with sloping outer surfaces 208A and 208B on the locking tabs 208 to assist in guiding the locking tabs 208 into the recesses 210 and to maintain them therein. The locking tabs 208 are partly bounded by slots to enable them to flex inwardly as required to permit them to ride over the sloping recess walls 212 when the lid is placed on or removed from the coffee maker 10. With this construction, the lid 18 is securely locked in place and will tend to remain in place even if the coffee maker is accidentally upset.

A cut-out 214 interrupts the skirt 204 adjacent its rearward end, the cut-out 214 being provided to prevent obstruction by the spigot 166. (If space permitted, the cut-out 214 would not be needed.) The forward end of the skirt 204 is also interrupted because it is not needed in the area of the spout 48. Rather, a tongue-like baffle 216 extends downwardly from the rim 202 into the spout 48 to partly close the opening of the spout 48 and thereby restrict the heat lost from the brewed coffee compartment 30 through the spout 48. Also, the rate with which coffee would pour out of an upset coffee maker is thereby minimized. Further in this regard, the forward portion of the skirt 204 closely overlies the brew basket flange 62. Therefore, the front portion of the brew basket is partly confined by the lid 18, which further protects against the loss of liquid or coffee grounds if the coffee maker is upset.

An advantage of having the cold water compartment 28 partly surround the brewed coffee container 32 is that the dead air space left surrounding the brewed coffee container 32 after the cold water has been pumped out of the cold water compartment 28 provides thermal insulation between the brewed coffee container 32 and the outside wall of the coffee maker 10. The lower housing cover provides another dead air space that surrounds the lower end of the brewed coffee container 32. The dead air spaces serve to maintain the heated temperature of the brewed coffee and also to keep the outside wall of the coffee maker 10 relatively cool. Further to this end, as shown in FIG. 7 and by phantom lines in FIGS. 3 and 4, the lid 18 is provided with a depending, thin-walled baffle 218 bounding the area above the cold water fill port 52 to impede hot air or steam rising from the brew basket 60 from entering the cold water fill port 52.

An upwardly projecting handle, generally designated 220, is located centrally of the lid 18. Lid handle 220 preferably comprises a box-like structure which is hollow, again to provide a dead air space so that it will be relatively cool. Thus, the lid handle 220 is formed from an ovate, vertical wall 222 and an ovate top plate 224. Top plate 224 is preferably slightly larger in horizontal extent than the wall 222 to provide an outwardly projecting peripheral lip that enables one to obtain a firm grip on the lid handle 220.

Figure 10:
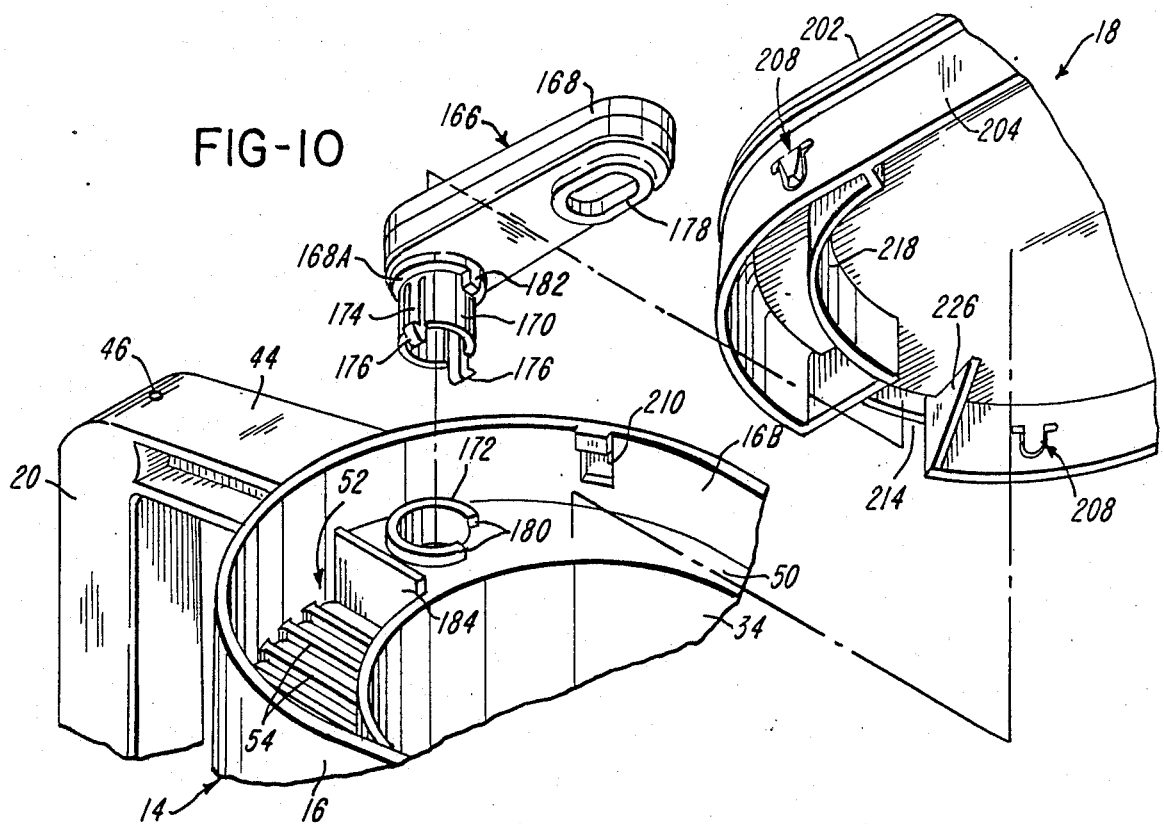
FIG. 10 is a fragmentary, exploded, perspective view of a portion of the housing, a spreader tube or spigot for delivering hot water to the brew basket, and a portion of the lid.
Figure 11:
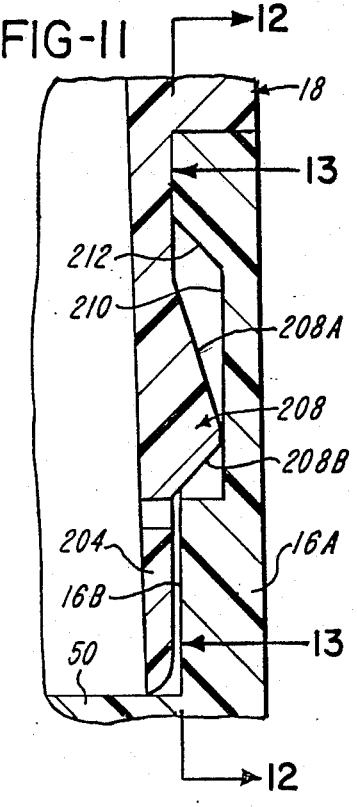
FIG. 11 is an enlarged, cross sectional view of the housing and the lid taken along line 11—11 of FIG. 4.
Figure 12:
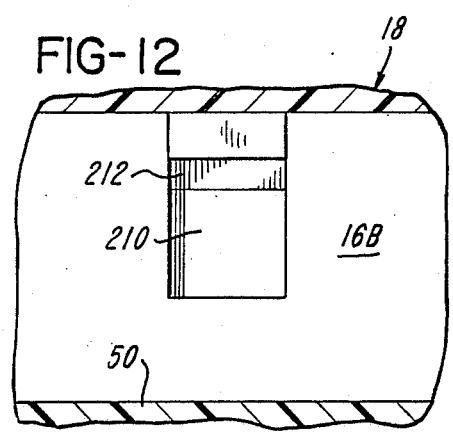
FIG. 12 is a fragmentary side elevational view of a portion of the housing as viewed in the direction of arrows 12—12 of FIG. 11 and on the same scale as FIG. 11.
Figure 13:
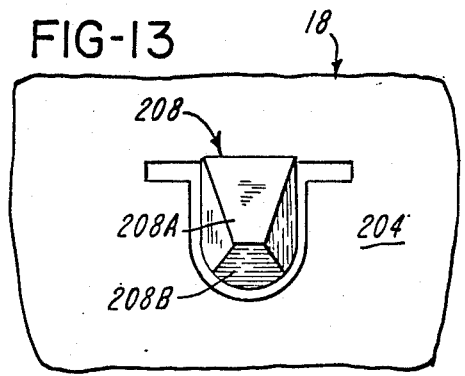
FIG. 13 is a fragmentary side elevational view of a portion of the lid as viewed in the direction of arrows 13—13 of FIG. 11 and on the same scale as FIG. 11.

The lid 18 is provided with a spigot-positioning gusset 226 shown in FIGS. 7 and 10, and by phantom lines in FIG. 4, extending inwardly from the lid skirt 204. The gusset 226 has a sloping lower edge surface and is so located that, if the spigot 166 is in its out-of-the-way position 166B when one attempts to put the lid 18 on the top of the housing, the gusset 226 cammingly forces the spigot 166 away from its out-of-the-way position 166B. Accordingly, when the lid 18 is in place, the spigot 166 will assuredly be located with its distal end over the brew basket 60. Here it may be noted that the brew basket could be improperly located within the brewed coffee container notwithstanding its locating tab 64. However, the locating tab 64 would then rest on the cover panel 50 and cause the top of the brew basket to be cocked at an angle and, in most instances, the brew basket 60 would interfere with the movement of the spigot 166 away from its out-of-the-way position 166B. Such condition would be immediately evident when one attempts to put on the lid 18. Thus, in view of the provision of the brew basket locating tab 64 and the spigot positioning gusset 226, it is unlikely that the coffee maker 10 would be operated with either the brew basket 60 or the spigot 166 improperly positioned.

The upper housing member 14 and the lower housing member 22 are preferably made from a suitable thermoplastic material. Although other thermoplastics may be used, polypropylene is the presently preferred material because it is inexpensive and also because it is sufficiently pliant that the warmer plate 38 may be rolled onto the lower edge of the lower container portion 36 without breaking the plastic. For economy of manufacture by injection molding techniques, it is preferred that the lower cylindrical wall 36 of the brewed coffee container 32 be integrally molded with the cold water compartment base wall 40 as illustrated in FIG. 3. With this construction there is no danger of leakage of the cold water around the brewed coffee container 32 so that the expense and complications of providing a seal around the brewed coffee container 32 are avoided.

Further to avoid the need for seals or the like, the upper and lower housing members 14 and 22 are bonded together in air and liquid tight relation. Preferably, they have mating tongue and groove connections along their confronting outside and inside edges. Thus, an upwardly facing continuous groove 230 extends along the outer, upper margin of the lower housing 22 and a mating, continuous depending tongue 232 extends along the outer, lower margin of the upper housing 14. Similarly, an upwardly facing continuous groove 234 extends along the inner, upper margin of the lower housing member 22 and a continuous depending tongue 236 extends along the inner, lower margin of the upper housing 14. These parts may advantageously be permanently joined by known magnetic induction welding, fusion welding, or vibration welding techniques. When the upper and lower housing members are made from polypropylene and induction welding is used, a ribbon (not shown) of polypropylene filled with iron particles is placed in the grooves 232 and 234 prior to bonding. The ribbon and the mating parts of the tongues and grooves fuse with one another into an integral matrix upon the subsequent application of magnetic induction forces.

With reference to FIGS. 3 and 8, and with further regard to the assembly of the parts, the lower housing 22 may have a pair of depending connecting pins 238 adapted to interfit apertures 240 in the lower housing cover 24 to secure proper alignment therebetween. After assembly of the lower housing cover 24 onto the lower housing 22, the lower end of the connecting pins 238 may be staked by heat and pressure to secure the lower housing 22 and the cover 24 together. The upper edge of the lower housing cover member 24 also fits within a downwardly facing notch in the outer periphery of the lower housing member 22 as illustrated in FIG. 5. Alignment of the coffee maker base 26 with the lower housing cover 24 is maintained by interfitting slotted members 242 depending from the lower housing cover 24 and gussets 244 in the base 26.

An important aspect of the coffee maker of this invention resides in the fact that the heating of the warmer plate 38 does not result in a heating of the lower end of the thermoplastic lower body member 22 to a temperature which would cause it to soften to the extent that it could lose its shape and jeopardize the integrity of the entire coffee maker. This benefit obtains primarily from the construction of the warmer plate and from the fact that the ADC heater and pump assembly 90 is clamped directly and centrally to the underside of the warmer plate 38 with the heater element side of the ADC heater and pump assembly housing 96 directly engaging the warmer plate in good heat-exchanging relation therewith. Heat generated by the ADC heater and pump assembly 90 is readily conducted through the thin stainless steel plate 38 but, because stainless steel is a relatively poor heat conductor and because the plate 38 has a surface area which is quite large in relation to its thickness, a substantially lesser temperature is created at the outer margin of the plate 38 than in the area of the heater and pump assembly 90. Further to minimize the heat generated at the margin of the plate 38, it is made non-planar to increase its surface area, and thus the effective distance along the plate from the points of connection of the ADC heater and pump assembly housing 96 to the outer margin of the plate 38. This may be done as shown in FIGS. 3 and 5 wherein the plate 38 is shown to have an upwardly sloping, annular panel portion 38A that extends further from the plane of the center panel than is needed to form the outer recess, designated 38B, which receives the lower margin of the lower container wall 36. If difficulty in heat build-up is encountered, the plate could be formed with "waves" (not shown) of upwardly and downwardly sloping annular panels similar to the panel 38B. The center of the warmer plate may be raised as indicated at 38C or otherwise formed to a non-planar configuration to increase its rigidity and thereby its resistance to becoming deformed when the coffee maker is assembled.

The heat level generated by the heater and pump assembly 90 in the base 26 is higher than would be acceptable if the base were made from most common thermoplastic materials. Accordingly, the base 26 is preferably made from a thermosetting phenolic resin. The lid 18, the lower housing cover 24, and the spigot 166 are preferably made from the same thermoplastic material as the upper and lower housing members 14 and 22.

The method of using the coffee maker of this invention is believed apparent from the foregoing description. Briefly, one may remove the lid 18, pour water from a tap or pitcher into the fill port 52 to the desired level, as indicated by the level indicator 56, and plug the unit into a source of house current. Upon heating of the ADC heater and pump assembly 90, the water will be heated and pumped up the up tube and out the spigot over the coffee grounds until the cold water compartment 28 is emptied. At this time one may simply pour coffee out of the coffee maker into a coffee cup as if the ADC coffee maker 10 were a standard electric household percolator. The ADC heater and pump assembly 90 will continue to intermittently operate to keep the warmer plate heated so long as the unit is plugged in. However, if desired, one may unplug the unit after the brewing process has been completed and remove the coffee maker to a remote location. Because of the unique construction of the coffee maker, the heat losses from the brewed coffee container are relatively small so that the brewed coffee will remain warm for an extensive period of time after the unit is unplugged. After use, one may remove the used coffee grounds and gain access to clean the brewed coffee container 32 by simply removing the lid 18 and pivoting the spigot 166 to its out-of-the-way position 166B. The cold water compartment may be cleaned in the same manner as any conventional ADC coffee maker.

Although the preferred embodiment of this invention has been described, it will be apparent that various changes may be made within the purview of the following claims.

We claim:

1. An ADC coffee maker comprising:
   a housing;
   a brewed coffee container within said housing closed at its lower end by a warmer plate;
   pour spout means forming an upwardly open trough extending from the upper end of said brewed coffee container for pouring brewed coffee from said brewed coffee container into a coffee cup;
   brew basket means removably mounted in the upper end of said brewed coffee container;
   a cold water compartment surrounding a portion of said brewed coffee container;
   cold water compartment cover means extending between the upper end of said brewed coffee compartment and surface portions of said housing for covering the upper end of said cold water compartment, said cover means having a fill port through which cold water may be poured to fill said cold water compartment;
   an ADC heater and pump assembly beneath said warmer plate for heating water supplied from said cold water compartment;
   hot water delivery means for delivering water heated and pumped by said ADC heater and pump assembly into said brew basket;
   a removable lid extending over the upper end of said housing and covering said brew basket means and said fill port; and
   electric circuit means for controlling the operation of said ADC heater and pump assembly.

2. The ADC coffee maker of claim 1 wherein said housing comprises:
   a. a first, hollow, vertically extending, generally tubular housing section,
   b. a second, hollow, housing section spaced from said first housing section and being shaped and sized to form a hollow handle about which one's hand may be wrapped, and
   c. a third housing section merging with and interconnecting the lower end portions of said first and said second housing sections.

3. The ADC coffee maker of claim 2 wherein said brewed coffee compartment and said cover means are located within said first housing section.

4. The ADC coffee maker of claim 2 wherein said second housing section comprises a substantially vertical post and wherein means are provided for connecting the upper end of said second housing section to the upper end of said first housing section.

5. The ADC coffee maker of claim 2 wherein said second housing section has air vent means in its upper end to prevent air lock therein so that it can store a substantial volume of cold water.

6. The ADC coffee maker of claim 5 wherein said second housing section comprises a substantially vertical post and wherein means are provided for connecting the upper end of said second housing section to the upper end of said first housing section.

7. The ADC coffee maker of claim 1 wherein said lid has baffle means for impeding steam rising from said brew basket means from entering said fill port.

8. The ADC coffee maker of claim 1 wherein said lid has a tab depending into said spout means to reduce heat loss from said brewed coffee container and to restrict the flow of brewed coffee from said spout means in the event said coffee maker is upset.

9. The ADC coffee maker of claim 8 wherein said lid is provided with means preventing said spigot from being so located that it overlies said cover means when said lid is positioned on said housing.

10. The ADC coffee maker of claim 9 wherein said lid has baffle means for impeding steam rising from said brew basket means from entering said fill port.

11. The ADC coffee maker of claim 1 wherein said lid has a tab depending into said spout means to reduce heat loss from said brewed coffee container and to restrict the flow of brewed coffee from said spout means in the event said coffee maker is upset.

12. The ADC coffee maker of claim 1 wherein said hot water delivery means includes a spigot pivotally connected to said cover means.

13. The ADC coffee maker of claim 12 wherein stop means are provided to prevent said spigot from being pivoted to a position overlying said fill port to avoid having hot water enter said cold water compartment.

14. The ADC coffee maker of claim 1 wherein said brew basket means has a slot opening to said cold water compartment to permit hot water overflowing said brew basket means to flow into said brewed coffee compartment to avoid having hot water enter said cold water compartment.

15. The ADC coffee maker of claim 1 wherein said cover means extends substantially completely around said brewed coffee compartment.

16. The ADC coffee maker of claim 1 wherein the lower end of said brewed coffee container comprises a substantially right circular cylinder having a thin wall formed of a thermoplastic material and wherein said warmer plate comprises a circular stainless steel plate having an outer margin seamed onto said lower end of said brewed coffee compartment.

17. The ADC coffee maker of claim 16 wherein said ADC heater and pump assembly is mounted to be engaged centrally on the underside of said warmer plate, and said warmer plate has non-planar portions for increasing the effective surface area thereof between the points of engagement of said heater and pump assembly with said warmer plate and said outer margin of said plate.

18. The ADC coffee maker of claim 17 wherein said thermoplastic is polypropylene.

19. The ADC coffee maker of claim 1 wherein said housing comprises a thermoplastic resin.

20. The ADC coffee maker of claim 1 wherein said housing comprises an upper housing member and a lower housing member, said housing members being joined along confronting edges thereof by an air and liquid tight bond.

21. The ADC coffee maker of claim 1 wherein said brew basket means comprises a brew basket having a floor that slopes downwardly away from said pour spout means.

22. The ADC coffee maker of claim 21 wherein said brew basket means further comprises a removable filter made from paper or the like material, and said brew basket has ribs projecting upwardly from said floor that hold said filter above said floor.

23. The ADC coffee maker of claim 21 wherein said floor of brew basket is wider at its end nearest said spout means than at its end most remote from said spout means.

24. The ADC coffee maker of claim 1 wherein said brew basket means has baffle means extending over its upper end portion nearest said spout means for preventing coffee grounds from falling out of said brew basket means.

25. The ADC coffee maker of claim 1 wherein said brew basket means has a tab depending into said spout means to orient said brew basket with respect to said brewed coffee container.

26. The ADC coffee maker of claim 1 wherein said warmer plate comprises a metal plate having non-planar portions between its center portion and its rim.

27. The ADC coffee maker of claim 26 wherein said warmer plate is made from stainless steel.

28. An ADC coffee maker comprising:
a housing; and
a brewed coffee container within said housing having a lower end comprising a cylindrical body member having a lower end formed from a thin wall of thermoplastic material and closed by a warmer plate comprising a stainless steel plate having an outer margin seamed onto said lower end of said body member.

29. The ADC coffee maker of claim 28 wherein said cylindrical body member comprises a substantially right circular cylinder.

30. The ADC coffee maker of claim 28 wherein said thermoplastic is polypropylene.

31. The ADC coffee maker of claim 28 further comprising an ADC heater and pump assembly mounted on the underside of said warmer plate, and wherein said warmer plate has non-planar portions for increasing the effective surface area thereof between the points of engagement of said heater and pump assembly with said warmer plate and said outer margin of said plate.

32. An ADC coffee maker comprising:
a housing having a rear portion and a front portion;
a brewed coffee container within said housing;
means mounting said container at a fixed location within said housing;
pour spout means forming an upwardly open trough extending from the upper end of said brewed coffee container through said front portion of said housing for pouring brewed coffee from said brewed coffee container into a coffee cup; and
a brew basket having a front portion and a rear portion removably mounted in the upper end of said brewed coffee container, said brew basket comprising means for orienting it with respect to said housing so that its said front portion is adjacent said front portion of said housing and its said rear portion is adjacent said rear portion of said housing; a cup-like body for receiving coffee grounds and having means at its upper end for deriving support from said brewed coffee container, a floor that slopes downwardly from front to rear, and a coffee drain at the rearward end of said floor.

33. The ADC coffee maker of claim 32 wherein said brew basket floor has side edges converging from a maximum width at its front end to a lesser width at its rearward end.

34. The ADC coffee maker of claim 32 wherein said brew basket further comprises a baffle along the upper front margin thereof to protect against coffee grounds falling out of said brew basket when brewed coffee is being poured from said spout.

35. The ADC coffee maker of claim 32 wherein said orienting means comprises a tab depending into said spout.

36. The ADC coffee maker of claim 32 further comprising:
a cold water compartment within said housing;
cover means for covering the upper end of said cold water compartment;
a fill port through which cold water may be poured to fill said cold water compartment; and
a removable lid extending over the upper end of said housing and said brew basket and covering said fill port.

* * * * *